United States Patent
Takeyama et al.

(10) Patent No.: US 6,809,142 B1
(45) Date of Patent: Oct. 26, 2004

(54) PRESSURE SENSITIVE SEALANT COMPOSITION AND METHOD OF SEALING BY USING SAME

(75) Inventors: Hidekazu Takeyama, Kanagawa (JP); Tomohiro Kawasaki, Kanagawa (JP); Masahiko Ohnishi, Kanagawa (JP); Minoru Matano, Kanagawa (JP); Akira Ozaki, Kanagawa (JP); Katsuyuki Arima, Milton Keynes (GB)

(73) Assignees: Nissan Motor Co., Ltd., Yokohama (JP); Yokohama Rubber Co., Ltd., Tokyo (JP)

( * ) Notice: Subject to any disclaimer, the term of this patent is extended or adjusted under 35 U.S.C. 154(b) by 0 days.

(21) Appl. No.: 09/420,491

(22) Filed: Oct. 19, 1999

(30) Foreign Application Priority Data

Oct. 19, 1998 (JP) .......................................... 10-296798

(51) Int. Cl.⁷ ................................................ C08K 5/01

(52) U.S. Cl. ...................... 524/476; 524/275; 524/277; 524/477; 524/478

(58) Field of Search ................................. 524/275, 277, 524/476, 477, 478

(56) References Cited

U.S. PATENT DOCUMENTS 4,857,594 A * 8/1989 Lakshmanan et al. ........ 525/98

* cited by examiner

*Primary Examiner*—James J. Seldleck
*Assistant Examiner*—U. K. Rajguru
(74) *Attorney, Agent, or Firm*—Foley & Lardner LLP

(57) ABSTRACT

The invention relates to a pressure sensitive sealant composition for sealing a clearance between a lamp unit housing and a vehicle body panel of an automotive vehicle. The pressure sensitive sealant composition includes (a) 10–40 wt % of a component A that is at least one copolymer selected from the group consisting of hydrogenated styrene-butadiene copolymers, hydrogenated styrene-isoprene copolymers, and modified copolymers thereof; (b) a component B that is at least one tackifier selected from the group consisting of petroleum resins, terpene resins, rosin resins, coumarone-indene resins, hydrogenated resins thereof, and modified resins thereof, and (c) a component C that is a hydrocarbonic plasticizer. The pressure sensitive sealant composition is prepared by maxing together 100 parts by weight of the component A, 20–60 parts by weight of said component B, and 150–400 parts by weight of said component C. In order to apply the pressure sensitive sealant composition for the purpose of saealing, the pressure sensitive sealant composition is heated end directly applied in the state of a bead onto a member to be sealed, or otherwise applied to the member after it has been formed into the bead state.

13 Claims, No Drawings

PRESSURE SENSITIVE SEALANT COMPOSITION AND METHOD OF SEALING BY USING SAME

BACKGROUND OF THE INVENTION

This invention relates to a pressure sensitive sealant composition and a method for sealing by using the sealant composition, and more particularly to the sealant composition which is used in a clearance between a rear combination lamp unit and a vehicle body of an automotive vehicle and provided with improved watertight seal under environmental condition where the vehicle is used, improved operational efficiency for repairing and disassembly of the lamp unit, and improved removal characteristics allowing the sealant composition to be peeled of in an interfacial breaking condition, and the sealing method by use the sealant composition.

In an assembly process of a modern automotive vehicle, lamp (light) unite such as rear combination lamp units are installed to a vehicle body which has been painted, at a trimming step. At this time, a variety of sealing materials are used in a clearance between each lamp unit and the vehicle body for the purpose of obtaining water-tight seal therebetween. In general, a molded gasket or a butyl rubber based adhesive is used as the sealing material The molded gasket is usually formed by punching out a sheet formed of closed cell-type foam rubber or plastic, and the butyl rubber based adhesive is usually applied upon heating at a temperature not lower than 100° C.

SUMMARY OF THE INVENTION

Concerning the molded gasket, it has been previously formed by punching out the above sheet into a shape corresponding to a portion requiring a water-tight seal on the side of a housing of the rear combination lamp unit. The thus formed molded gasket is assembled in the seal required portion on the side of the rear combination lamp unit housing. This molded gasket exhibits its water-tight seal under the effect of resilience generated upon compression or when compressingly put between the rear combination lamp unit housing and the vehicle body panel by engaging small screws provided on the side of the rear combination lamp unit housing. More specifically, the molded gasket is usually formed by punching out the sheet of the closed cell-type foam material by using a metallic die or a so called Thomson blade. The foam material is made of rubber (such as EPDM= copolymer of ethylene, propylene and diene), polyurethane resin, silicone resin or the like, and has been foamed to have a volume of 3 to 5 times that in its not-foamed state. In such a case, the molded gasket is used upon being compressed 25 to 50% in direction of thickness thereof when the rear combination lamp unit is assembled in the vehicle body, in order to obtain necessary resilience for the purpose of securing a water-tight seal between the rear combination lamp unit housing and the vehicle body panel.

However, under environmental conditions where automotive vehicles are used, the above molded gasket employed in a compressed state will be subjected to permanent deformation due to its deterioration caused by heat and/or humidity upon long time use. This relatively lowers the resilience of the molded gasket and therefore degrades water-tight seal. With this, water penetrates into, for example, a trunk compartment of the vehicle. Furthermore, such a molded gasket is not necessarily sufficient in follow-up characteristics to polyvinyl chloride-based sealant applied at a plurality of step sections having a step-height of about 1 mm in the vehicle body panel, for example, at a so-called zero joggle joint section between a rear fender panel and a rear panel, each section requiring water-tight seal. When the rear combination lamp unit is assembled in the vehicle body having such a surface structure, water-tight seal between the rear combination lamp unit and the vehicle body becomes insufficient thereby causing, for example, water leak into the trunk compartment of the vehicle.

Concerning the butyl rubber-based adhesive, it is first heated at a temperature of not lower than 100° C., and then applied on the surface of the housing of the rear combination lamp unit, following the shape of a section requiring water-tight seal. Such a butyl rubber-based adhesive can exhibit water-tight seal between the rear combination lamp unit and the vehicle body under a high adhesiveness to the plastic surface of the rear combination lamp unit housing and to the painted surface of the vehicle body panel, not under resilience generated upon compression as in the molded gasket. Besides, the butyl rubber-based adhesive is usually applied at the temperature of not lower than 100° C. along the shape of a groove formed on the surface of the tear combination lamp unit housing in such a manner as to take the state of a bead having a cross-sectional diameter ranging from 8 to 12 mm. Thus, the butyl rubber-based adhesive can provide water-tight seal in an interfacial region between the rear combination lamp unit housing and the vehicle body panel under the action of the high adhesiveness against the surface of the lamp unit housing and the surface of the vehicle body panel.

In general, the butyl rubber-based adhesive has such a characteristic that stress can be reduced immediately after compression and therefore it does not have resilience. Accordingly the butyl rubber-based adhesive does not make its decomposition and permanent deformation in the direction of thickness, owing to its deterioration upon being subjected to heat and humidity for a long time in the environmental conditions where automotive vehicles are used. Additionally, the butyl rubber-based adhesive can be smoothly reduced in stress immediately after compression, and therefore is sufficient in follow-up characteristics to step sections having a step-height of around 1 mm in the vehicle body panel at a section requiring water-tight seal. Thus, the butyl rubber-based adhesive is not problematic from the viewpoint of reliability for water-tight seal.

However, the butyl rubber-based adhesive is high in adhesiveness, and therefore a edge section of the rear combination lamp unit is required to be broken open by a plastic bar or the like while it is gradually heated by an industrial dryer or the like, for the purpose of disassembling the rear combination lamp unit when the rear combination lamp unit is replaced with a new one in an automotive vehicle service factory or the like. Such operations are very troublesome. Additionally, when the rear combination lamp unit is disassembled, the butyl rubber-based adhesive make its breaking (cohesive breaking) while leasing remains of the butyl rubber-based adhesive on the both surfaces of the vehicle body panel and of the rear combination lamp unit housing. Accordingly, in case that the new rear combination lamp unit with new butyl rubber-based adhesive is re-assembled in the vehicle body, it is required to manually remove the remains of the adhesive containing a large amount of dust, dirt and oil, left on the surface of the vehicle body panel, in order to secure water-tight seal after re-assembly of the new rear combination lamp unit. Such operations require a long time and a considerable labor. Besides, there is the fear that the butyl rubber-based adhesive adhered to the hands of an operator again adheres onto the painted surface of the vehicle body and to interior trims of the vehicle, thereby degrading the external appearance of the vehicle after the displacement operations for the rear combination lamp unit.

Further, when the vehicle is dismantled or scrapped, it is substantially impossible to recover and recycle the plastic materials (mainly polypropylene resin) of the rear combination lamp unit housing because it is very difficult to remove the butyl rubber-based adhesive which has been adhered deeply to the bottom surface of the grove formed on the rear combination lamp unit housing.

In view of the above drawbacks encountered in conventional techniques, the inventors have conducted researches and developments and found that a pressure sensitive sealant composition having a particular composition can effectively solve the conventional drawbacks, thereby reaching the present invention.

It is an object of the present invention to provide an improved pressure sensitive sealant composition and an improved sealing method, which can provide excellent water-tight while allowing the pressure sensitive sealant composition to be easily removable from a base member to which the sealant composition has been applied.

Another object of the present invention is to provide an improved pressure sensitive sealant composition and an improved sealing method, which can be effectively used in and for a clearance between a rear combination lamp unit and a vehicle body panel of an automotive vehicle, thereby exhibiting excellent water-tight seal and high operational efficiency for repairing and disassembly of the lamp unit, while preventing remains of the pressure sensitive sealant composition from being left on the surfaces of the rear combination lamp unit housing and the vehicle body panel.

An aspect of the present invention resides in a pressure sensitive sealant composition which comprises (a) 10–40 wt % of a component A that is at least one copolymer selected from the group consisting of hydrogenated styrene-butadiene copolymers, hydrogenated styrene-isoprene copolymers, and modified copolymers thereof; (b) a component B that is at least one tackifier selected from the group consisting of petroleum resins, terpene resins, rosin resins, coumarone-indene resins, hydrogenated resins thereof, and modified resins thereof: and (c) a component C that is a hydrocarbonic plasticizer, wherein said pressure sensitive sealant composition is prepared by mixing together 100 parts by weight of said component A, 20–60 parts by weight of said component B, and 150–400 parts by weight of said component C.

Another aspect of the present invention resides in a method for sealing a member, which comprises (a) preparing the pressure sensitive sealant composition; (b) heating the pressure sensitive sealant composition; and (c) applying the heated pressure sensitive sealant composition to the member.

A further aspect of the present invention resides in a method for sealing a member, which comprises (a) preparing the pressure sensitive sealant composition; (b) forming the pressure sensitive sealant composition into a predetermined shape; and (c) applying the pressure sensitive sealant composition of the predetermined shape to the member.

DETAILED DESCRIPTION OF THE INVENTION

As stated above, a pressure sensitive sealant composition according to the present invention comprises the component A that is at least one copolymer selected from the group consisting of hydrogenated styrene-butadiene copolymers (HSB), hydrogenated styrene-isoprene copolymers (HSI), and modified copolymers thereof. These modified copolymers are referred to, for example, as those prepared by introducing polar groups, such as carboxyl groups and hydroxyl groups, into HSB and HSI. The content of the component A in the pressure sensitive sealant composition is 10–40 wt %. If it is less than 10 wt %, the pressure sensitive sealant composition becomes inferior in weather ability and removability from a vehicle body panel upon disassembly of a rear combination lamp unit. If it is greater than 40 wt %, the pressure sensitive sealant composition becomes insufficient in adhesion. Furthermore, it becomes difficult to maintain the workability in discharging the pressure sensitive sealant composition from a nozzle due to the increase of its melt viscosity.

The pressure sensitive sealant composition further comprises a component B that is at least one tackifier selected from the group consisting of petroleum resins, terpene resins, rosin resins, coumarone-indene resins, hydrogenated resins thereof, and modified resins thereof. Of these, hydrogenated petroleum resins and modified terpene resins are particularly preferably used. The content of the component B in the pressure sensitive sealant composition is in a range of 20–60 parts by weight relative to 100 parts by weight of the component A. If it is in this range, it becomes possible to maintain a good balance between sealing property (adhesion) of the sealant composition and removability of the sealant composition. If it is less than 20 parts by weight, it becomes difficult to have a sufficient adhesion of the sealant composition. If it is greater than 60 parts by weight, it becomes difficult to disassemble a rear lamp unit and to remove the sealant composition.

The pressure sensitive sealant composition further comprises a component C that is a hydrocarbonic plasticizer. This hydrocarbonic plasticizer may be selected from various conventional and commercial products of hydrocarbonic plasticizer. Its preferable examples are liquid paraffin and polybutene and liquid polybutadiene. The content of the component C in the pressure sensitive sealant composition is in a range of 150–400 parts by weight relative to 100 parts by weight of the component A. If it is less than 150 parts by weight, the sealant composition becomes inferior in adhesion. Furthermore, it becomes difficult to maintain the workability in discharging the pressure sensitive sealant composition from a nozzle due to the increase of its melt viscosity. If it is greater than 400 parts by weight, it becomes difficult to disassemble a rear lamp unit and to remove the sealant composition. Furthermore, the heat resistant flow temperature becomes too low.

Besides the above-mentioned components A, B and C, the pressure sensitive sealant composition may optionally comprise at least one additive such as wax, filler, and antioxidant. The content of the at least one additive in the sealant composition is preferably 5–40 wt %, from the viewpoints of (1) the formation of the sealant composition into state of a bead and (2) the workability in discharging the pressure sensitive sealant composition from a nozzle. Preferable examples of the wax are paraffin wax, microcrystalline wax, Fisher-Tropsh wax, lower molecular weight polyethylene, lower molecular weight polypropylene, atactic polypropylene, and modified products of these. Preferable examples of the filler are calcium carbonate, barium sulfate, talc, clay, titanium oxide, carbon black, white carbon, glass balloon. Examples of the antioxidant are hindered phenol antioxidant and hindered amine antioxidant.

It is preferable that the pressure sensitive sealant composition has a 180° angle peel strength ranging from 10 to 50 N/25 mm. When its 180° angle peel strength is in this range, it becomes possible to easily detach a sealed end portion of a rear combination lamp housing from a vehicle body panel by a plastic bar or by hand and then to completely remove the lamp housing from the vehicle body panel by making an interfacial breaking of the sealant composition by hand. The 180° angle peel strength may be measured as follows: First, a laminate is prepared. This laminate has (1) a polyester film (thickness: 100 μm), (2) a layer of the pressure sensitive sealant composition attached to the polyester film, and (3) a removable paper attached to the sealant composition layer. Then, a portion of the removable paper is peeled off from the sealant composition layer. After that, the resultant exposed portion of the sealant composition layer is attached to a first portion of a painted sheet by adding a load of 4 kgf using a roller, thereby to prepare a specimen. Then, the specimen is allowed to stand still for 24 hr at room temperature Then, the specimen is set in a tensile tester, in which only a second portion of the painted sheet and only the laminate are respectively grasped by upper and lower grasping devices. In such a set state, these are pulled in opposite directions (or in directions different an angle of 180°) through the upper and lower grasping devices at a speed of 50 mm/min. An Autograph DSS*500 model (trade name) produced by Shimadzu Corporation may be used as the tensile tester.

The pressure sensitive sealant composition of the present invention can be prepared by supplying the above-discussed components A, B and C, and additives such as other fillers and antioxidants, if necessary, into a kneader whose temperature is set at a level at which the above components and the additives melt; and then by sufficiently melt and mixing the content of the kneader. Examples of the kneader are a Henschel mixer, a Brabender type kneader, and a disperser which are provided with a heating device and defoaming device. The inside of the kneader is at a reduced pressure, if necessary, in which the content (mixed substances) of the kneader is stirred until it becomes homogeneous. The thus obtained pressure sensitive sealant composition is filled and stored in a pail or a drum.

Hereinafter, a method of sealing with a sealant of the above-discussed pressure sensitive sealant composition will be discussed. The base member to be sealed with the sealant is not limited to a particular one; however, the pressure sensitive sealant composition of the present invention is effectively used as the sealant particularly in case that the base member is a housing of the rear combination lamp (light) unit, or a vehicle body panel of an automotive vehicle. Discussion will be made on such a case.

As an example, the pressure sensitive sealant composition of the present invention is applied under heating in and along a rib-groove formed on the housing of the rear combination lamp unit of the automotive vehicle, in the state of a generally round bead having a cross-sectional diameter, for example, ranging from 8 to 12 mm. More specifically, the pressure sensitive sealant composition stored in the pail or the drum is applied on the surface of the housing of the rear combination lamp unit, for example, by using a heating and applicating apparatus generally called a bulk melter. The bulk melter is arranged such that its casing plate is heated at a temperature not lower than 100° C., preferably at about 150° C., so that only the pressure sensitive sealant composition located immediately under the casing plate is molten, upon which the sealing composition is sucked up by a constant flow rate gear pump or the like, so as to be applied onto the surface of the housing of the rear combination lamp unit through an applying device having the application nozzle.

It is usual that the pressure sensitive sealant composition is heated and applied in the state of the bead onto the surface of the base member (to be sealed) such as the rear combination lamp unit housing, by discharging. However, as far as sufficient water-tight seal can be ensured, the bead of the pressure sensitive sealant composition may take the cross-sectional shape of oval or triangle, or other different cross-sectional shapes (such as an asymmetrical cross-sectional shape relative to a line passing through the center of the cross-section of the bead) as occasion demands. Such cross-sectional shapes are obtained by changing the cross-sectional shape of a tip end section of the application nozzle. Thus, the cross-sectional shape of the bead of the pressure sensitive sealant composition is not limited to particular one. In case that the bead of the pressure sensitive sealant composition is required to have a larger cross-sectional diameter or a larger cross-sectional height (vertical diametrical axis in cross-section), the inner diameter of the tip end section of the application nozzle may be increased or changed, or otherwise a farther bead of the pressure sensitive sealant composition may be applied or overlapped onto a bead which has been previously applied onto the surface of the base member.

The pressure sensitive sealant composition heated and applied in the state of the bead onto the surface of the rear combination lamp unit housing is formed in a loop-shape on the surface of the housing so that its application-starting end section and application-terminating end section are connected. In this regard, since the pressure sensitive sealant composition heated at the temperature not lower than 100° C., the application-starting end section and the application-terminating end section of the pressure sensitive sealant composition in the bead state can be molten and mixed with each other after when the application of the pressure sensitive sealant composition is completed, as long as the pressure sensitive sealant composition is not rapidly cool d. As a result, the pressure sensitive sealant composition in the b ad state can be completely stuck on the surface of the rear combination lamp unit housing without forming application defects such as a pass (clearance) in a connection section at which the application-starting and application-terminating end sections are connected with each other.

Otherwise, the pressure sensitive sealant composition may be previously heated and applied in the state of a bead onto the surface of a removable paper or sheet which can be readily removable from the pressure sensitive sealant composition, thereby forming the pressure sensitive sealant composition into a loop-shape required for maintaining the water-tight seal for the rear combination lamp unit. The removable sheet is formed, for example, of formed of polytetrafluoroethylene. The thus formed loop-shaped pressure sensitive sealant composition is automatically or manually stuck onto the surface of the rear combination lamp unit housing of the automotive vehicle as a loop-shaped sticky molded gasket.

Furthermore, the pressure sensitive sealant composition may be formed into the linear or string shape and wound in a required amount in the form of a coil or a bobbin. The thus formed pressure sensitive sealant composition is stuck on the surface of the rear combination lamp unit housing so as to be used like the molded gasket, which is not disadvantageous from the viewpoint of ensuring water-light seal. In this case, the application-starting end section and the application-terminating end section of the linear or string shape are connected with each other while being stuck on the surface of the surface of the rear combination lamp unit housing at a room temperature. In this case, the connected end sections do not melt and not become integral with each other. Accordingly, the application-starting end section and the application-terminating end section are overlapped each other by a length not smaller than 10 mm, which is preferable to obtain a sufficient water-tight seal.

Next, a method for assembling the rear combination lamp unit (with the pressure sensitive sealant composition) in the vehicle body will be discussed.

The rear combination lamp unit with the pressure sensitive sealant composition of the present invention is assembled to the automotive vehicle body which has been painted. The method of assembling the rear combination lamp unit is not limited to a particular one. Similarly to conventional techniques in which a molded gasket formed of a closed cell-type foam plastic or a butyl rubber-based adhesive is used in place of the pressure sensitive sealant composition in the present invention, it is general to mechanically fasten the rear combination lamp unit to the side of the vehicle body panel by using small screws provided on the side of the rear combination lamp unit. In case that the pressure sensitive sealant composition of the present invention is used for assembling the rear combination lamp unit in the vehicle body, the pressure sensitive sealant composition is interposed between the rear combination lamp unit housing and the vehicle body panel under a compressed condition in which the pressure sensitive sealant composition is compressed within a range of from 0 to 80% (compression rate), preferably 20 to 50% in a height of the applied pressure sensitive sealant composition (more specifically, in the cross-sectional height or in length of the vertical axis in the cross-section) of the applied bead state pressure sensitive sealant composition. By using the pressure sensitive sealant composition under the above compressed condition, sufficient water-tight seal between the rear combination lamp unit and the painted vehicle body panel can be obtained.

The pressure sensitive sealant composition of the present invention can exhibit high adhesiveness for the both surfaces of the painted vehicle body panel and the rear combination lamp unit housing immediately when the rear combination lamp unit is assembled in the vehicle body. Accordingly, it is unnecessary to make curing for hardening the pressure sensitive sealant composition and the refore unnecessary using a curing apparatus such as an oven, for the purpose of causing the water-tight seal of the pressure sensitive sealant composition to be exhibited. Additionally, even in case that a completed automotive vehicle provided with the rear combination lamp unit is left outside and stored in an outdoor pool, water-tight seal between the rear combination lamp unit and the vehicle body cannot be affected by being contacted with a large amount of water resulted from rain water or water of melted snow after snow fall.

Subsequently, a process for disassembling the rear combination lamp unit (with the pressure sensitive sealant composition) from the vehicle body will be discussed. When disassembly of the rear combination lamp unit with the pressure sensitive sealant composition from the vehicle body is required, the rear combination lamp unit can be easily detached from the vehicle body panel merely by releasing the mechanical restriction due to mechanical fastening parts for the combination lamp unit against the vehicle body under usual manual operation without skill. It will be understood that this disassembly operation for the rear combination lamp unit makes it unnecessary to use an industrial dryer or heating device to heat and lower the viscosity of the sealant or a removing tool such as a plastic bar. In this regard, in the conventional techniques, using such a device or tool has been necessary when the rear combination lamp is disassembled from the vehicle body.

The pressure sensitive sealant composition of the present invention used in a clearance between the rear combination lamp unit housing and the vehicle body panel is stuck on the both surfaces of the rear combination lamp unit housing and the vehicle body panel, in which the cohesive force of the pressure sensitive sealant composition is larger than the adhesiveness or stickiness of the same. As a result, when the rear combination lamp unit is detached from the vehicle body, no complete cohesive breaking can occur so as to be dissimilar to the conventional techniques using the butyl rubber-based adhesive in place of the pressure sensitive sealant composition of the present invention. This does not allow the remains of the pressure sensitive sealant composition to be left in an adhered state on the surfaces of the rear combination lamp housing and the vehicle body panel. Besides, this causes the stuck surface of the pressure sensitive sealant composition to well peel off under stress within a range of breaking elongation, thereby making an interfacial breaking so that the sealing composition can be readily peeled off from the surfaces of the rear combination lamp housing and the vehicle body panel without leaving the remains of the pressure sensitive sealant composition on the surfaces.

It will be appreciated from the above, that the pressure sensitive sealant composition of the present invention can be easily detached from the base members (such as the rear combination lamp unit housing and the vehicle body panel), and therefore the rear combination lamp unit can be readily disassembled from the vehicle body within a short time regardless of skill of an operator, without using particular disassembling tools which are required in the conventional techniques using the molded gaskets or the butyl rubber-based adhesive in place of the pressure sensitive sealant composition of the present invention.

The following examples are included merely to aid the understanding of the invention, and variations may be made by one skilled in the art without departing from the spirit and scope of the invention.

EXAMPLE;S 1, 2, 3 and 4

(1) Preparation of Pressure Sensitive Sealant Compositions

A pressure sensitive sealant composition of each of Examples 1 to 4 was prepared by supplying components in amounts (parts by weight) shown in Table 1 into a kneader and by melting and mixing the components upon heating for 120 minutes.

TABLE 1

|  | Ex. 1 | Ex. 2 | Ex. 3 | Ex. 4 |
| --- | --- | --- | --- | --- |
| Raw Materials (parts by weight) | | | | |
| Component A (KRATON G-1652*) | 100 | 100 | 100 | 100 |
| Component B (ESCOREZ 5320*) | 20 | 80 | 50 | 50 |
| Component C (HV-100*) | 150 | 150 | 150 | 0 |
| Component C (HV-800*) | 0 | 0 | 0 | 250 |
| Polyethylene Wax (NEOWAX L*) | 55 | 55 | 55 | 0 |
| Anti-oxidant (IRGANOX 1010*) | 1 | 1 | 1 | 1 |
| Component A Content (wt %) | 30.7 | 29.8 | 28.1 | 24.9 |

*KRATON G-1652 (trade name): Hydrogenated styrene-butadiene block copolymer of Shell Chemical Co.
*ESCOREZ 5320 (trade name): Hydrogenated petroleum resin of Tonex Co.
*HV-100 and HV-800 (trade names): Polybutenes of NIPPON PETROCHEMICALS CO.
*NEOWAX (trade name): Polyethylene wax of Yasuhara Chemical Co.
*IRGANOX 1010 (trade name): Hindered phenol antioxidant of Nippon Ciba-Geigy Co.

(2) Application of Pressure Sensitive Sealant Composition and Assembly of Rear Combination Lamp Unit in Vehicle Body The pressure sensitive sealant composition prepared as discussed above and corresponding to each of Examples 1–4 was supplied into a heating and applying apparatus generally called a bulk melter. The heating and applying apparatus had a casing plate heated at 150° C. The pressure sensitive sealant composition was located immediately under the heated casing plate and therefore molten. The molten pressure sensitive sealant composition was sucked up by a constant flow rate gear pump of an applying device and discharged through a metallic nozzle onto the surface of a housing of a rear combination lamp unit of an automotive vehicle body. At this time, the tip end section of the metallic nozzle was set at 120° C. Thus, application of the pressure sensitive sealant composition was accomplished in its heated state. In this case, the housing of the rear combination lamp unit was formed of extremely high rigidity polypropylene resin, in which no chemical surface-treatment and no application of primer were made on the surface of the housing.

The heated and applied pressure sensitive sealant composition was formed into the state of a bead having the cross-sectional shape of a complete round having a diameter of 10 mm. The application-starting end section and the application-terminating end section of the bead state pressure sensitive sealant composition were connected with each other, in which they were immediately molten and mixed with each other to form an integral connection section so that the pressure sensitive sealant composition was formed loop-shaped on the surface of the housing of the rear combination lamp unit, because the temperature of the pressure sensitive sealant composition to be applied was sufficiently high. It had been confirmed that a seam between the application-starting end section and the application-terminating end section could not been found under visual observation in case that the surface temperature of the application-starting end section of the bead state pressure sensitive sealant composition was not lower than about 60° C.

The rear combination lamp unit on which the pressure sensitive sealant composition had been applied was assembled to an automotive vehicle body panel which had been painted, and mechanically fastened to the vehicle body panel by using four small screws. The paint of the pained vehicle body panel was acrylic melamine resin paint which had been generally used as a paint for an automotive vehicle body. No surface-treatment and no primer application were made on the top surface of the painted vehicle body panel.

When the rear combination lamp unit was mechanically fastened to the vehicle body panel, the pressure sensitive sealant composition of the b ad state was compressed in the direction of the cross-sectional height (vertical diametrical axis in cross-section). In this instance, the clearance between the vehicle body panel and the rear combination lamp unit housing was about 5 mm, in which the pressure sensitive sealant composition of the bead state was compressed at a compression rate of 50%. The compression rate was calculated by an equation ((the cross-sectional height after compression/the cross-sectional height before compression)×100%)

EXPERIMENT

1) Test 1 for Evaluation of Water-tight Seal under Artificial Rainfall

Two combination lamp unite were assembled in the vehicle body of a general small-size sedan automotive vehicle and located respectively at left and right parts of the rear section of the vehicle body, in which the pressure sensitive sealant composition (of Example 2 in Table 1) was used between the housing of each combination lamp unit and the panel of the vehicle body in the above-discussed loop-shape. The sedan automotive vehicle was in a complete state. Seventy such complete sedan automotive vehicles were subjected to Test 1, so that 140 rear combination lamp units were subjected to Test 1.

In each complete automotive vehicle, the panel of the vehicle body had been uniformly coated with a paint; and a portion of the panel to be sealed with the pressure sensitive sealant composition did not have a so-called zero joggle joint section (jointed by spot welding) and non-uniform panel step-section. The same portion of the panel had left-side and right-side parts which were asymmetric with each other. The corresponding portions (to be sealed with the pressure sensitive sealant composition) at the left and right parts of the rear section of the vehicle body had the same surface shape.

Each complete automotive vehicle was subjected to artificial rainfall in order to evaluate the water-tight seal for the rear combination lamp units, as follows: A large amount of continuous artificial rainfall was made on the complete automotive vehicle by using an artificial rainfall machine of the type making continuous rainfall, in which rainfall was in an amount corresponded to 20 mm per 1 hour and continued for 12 hours. After the continuous rainfall, leak of rain water into a trunk compartment was detected by visual observation thereby obtaining test results shown in Table 2 in which left-side and right-side lamp units were respectively located at left-side and right-side of the rear section of the vehicle body as viewed from a position located rearward of the vehicle. Evaluation of the water-tight seal of the pressure sensitive sealant composition was made with the test results shown in Table 2.

TABLE 2

| Location of lamp unit | Left-side lamp unit | Right-side lamp unit |
| --- | --- | --- |
| Number of vehicles causing no rain water leak | 70 | 70 |
| Number of vehicles causing rain water leak | 0 | 0 |

2) Test 2 for Evaluation of Water-tight Seal of Pressure Sensitive Sealant Composition under High Pressure Car-Washing Five complete automotive vehicles corresponding to those used in Test 1 were subjected to high pressure car-washing in order to confirm the water-tight seal for the rear combination lamp units. The high pressure car-washing was conducted as follows: Water of city water was continuously ejected at a water pressure of 3.0 kgf/cm$^2$ for 10 minutes from a nozzle of a high pressure car-washing machine onto the rear section of the vehicle body of the automotive vehicle. The distance from the tip end of the nozzle to the applied sealant composition was about 30 cm. The amount of water ejected from the nozzle was 27.5 liters per minute.

After this high pressure water ejection, leak of rain water into a trunk compartment was detected by visual observation thereby obtaining test results shown in Table 3, in the same manner as Test 1. Evaluation of the water-tight seal of the pressure sensitive sealant composition was made with the test results shown in Table 3.

TABLE 3

| Location of lamp unit | Left-side lamp unit | Right-side lamp unit |
|---|---|---|
| Number of vehicles causing no rain water leak | 5 | 5 |
| Number of vehicles causing rain water leak | 0 | 0 |

3) Test 3 for Evaluation of Water-tight Seal of Pressure Sensitive Sealant Composition upon Durability (deterioration) Test In order to evaluate the water-tight seal of the pressure sensitive sealant composition upon a long time use, first five small-size sedan automotive vehicles as same as those in Test 2 were subjected to a durability (deterioration) test. In each sedan automotive vehicle, left-side and right-side rear combination lamp units were assembled in the vehicle body by using the pressure sensitive sealant composition. The durability test war, conducted as follows: Each sedan automotive vehicle was located in an environment test room and subjected to temperature histories (thermal cycles) in which the ambient temperature was changed repeatedly between a low temperature condition to a high temperature condition. Specifically, each temperature history (thermal cycle) was such that the ambient temperature within the environmental test room was first gradually lowered from a room temperature condition to a low temperature of −40° C.; secondly the low temperature was maintained for 83 hours; and thirdly the ambient temperature was gradually raised from the low temperature to a high temperature of 90° C.; lastly the ambient temperature was gradually raised to the room temperature condition. This temperature history constituted one thermal cycle. This thermal cycle was repeated 10 times to constitute ten thermal cycles.

After the ten thermal cycles had been completed upon which the automotive vehicle was in the room temperature condition, each automotive vehicle wan subjected to the same high pressure car-washing as in Test 2 under the same conditions as in Test 2. After this high pressure car-washing, leak of rain water into a trunk compartment of the automotive vehicle was detected by visual observation thereby obtaining test results shown in Table 4, in the same manner as in Test 2. Evaluation of the water-tight seal of the pressure sensitive sealant composition was made with the test results shown in Table 4.

TABLE 4

| Location of lamp unit | Left-side lamp unit | Right-side lamp unit |
|---|---|---|
| Number of vehicles causing no rain water leak | 5 | 5 |
| Number of vehicles causing rain water leak | 0 | 0 |

As a result of Tests 1 to 3 in which totally 80 automotive vehicles were tested, there was no automotive vehicle in which rain water leak into the trunk compartment was recognized. This demonstrates that the pressure sensitive sealant composition according to the present invention can exhibit good water-tight seal between the rear combination lamp unit and the vehicle body.

4) Test 4 for Evaluation of Removal Characteristics of Pressure Sensitive Sealant Composition Five small-size sedan automotive vehicles (respectively having Vehicle Nos. 1, 2, 3, 4 and 5) as same as those in Test 3 were subjected to the thermal cycles in the same manner as that in Test 3. After the ten thermal cycles had been completed, evaluation for removal characteristics of the pressure sensitive sealant composition was conducted as follows: The left-side and right-side rear combination lamp units were disassembled from the vehicle body by disengaging the small screws from a mechanically connecting section between each rear combination lamp unit and the vehicle body upon previously removing trim parts located inside the trunk compartment; and then the painted surface of the vehicle body panel was cleaned. At this time, measurement was made for a time (minute) required to restore the painted surface to a condition in which the rear combination lamp was able to be assembled in the vehicle body by using the pressure sensitive sealant composition, from a time point at which the small screws had been disengaged from the mechanically connecting section. More specifically, the required time included a disassembling time required for disassembling the rear combination lamp unit from the vehicle body, and a cleaning time for cleaning the painted surfaces of the rear combination lamp unit housing and the vehicle body panel. Such measuring the time required to restore was employed for evaluation of the removal characteristics of the pressure sensitive sealant composition for the reasons set forth below. That is, if cleaning for remains of the sealant composition was insufficient and difficult taking a long time, the sealant composition could not sufficiently and uniformly contacted with the rear combination lamp unit housing and the vehicle body panel so as to cause leak of water with lapse of a long time. The test results of Test 4 on the pressure sensitive sealant compositions (indicated as "Example") of the present invention are shown in Table 5 so as to evaluate the removal characteristics of the pressure sensitive sealant composition of the present invention, in which the disassembling time (minute) and the cleaning time (minute) are indicated.

For the comparison purpose, a small-size sedan automotive vehicle (having Vehicle No. 6) were prepared and subjected to Test 4 in the same manner as that for vehicles of Vehicle Nos. 1 to 5 to obtain test results (indicated as "Comparative Example") shown in the Table 5. The automotive vehicle of Vehicle No. 6 was the same as that of Vehicle Nos. 1 to 5 with the exception that a butyl rubber-based adhesive was used in place of the pressure sensitive sealant composition. In other words, in the automotive vehicle of Vehicle No. 6, each of the left-side and right-side rear combination lamps was sealingly assembled to the vehicle body by using the butyl rubber-based adhesive.

TABLE 5

| Vehicle No. | Example | | | | Comparative Example | | | |
|---|---|---|---|---|---|---|---|---|
| | Left-side lamp | | Right-side lamp | | Left-side lamp | | Right-side lamp | |
| | Disae. time | Clean. time | Disae. time | Clean. time | Disae. time | Clean. time | Disae. time | Clean. time |
| 1 | 0.6 | Not required | 0.8 | Not required | — | — | — | — |
| 2 | 0.7 | Not required | 0.7 | Not required | — | — | — | — |
| 3 | 0.6 | Not required | 0.7 | Not required | — | — | — | — |
| 4 | 1.0 | Not required | 1.0 | Not required | — | — | — | — |
| 5 | 1.0 | Not required | 1.0 | Not required | — | — | — | — |
| 6 | — | — | — | — | 3.0 | 25 | 5.0 | 30 |

(Unit: Min.)

As will be understood from the above test results, concerning the five vehicles (Vehicle Nos. 1 to 5), no particular tool was required to disassemble the rear combination lamp unit from the vehicle body while completing a dissembling operation for the rear combination lamp unit only within one minute, in which there was no remains of the pressure sensitive sealant composition left on the surface of the painted surface of the vehicle body panel and the surface of the rear combination lamp unit housing. In contrast, concerning the vehicle (Vehicle No. 6) using the butyl rubber-based adhesive in place of the pressure sensitive sealant composition of the present invention, an industrial dryer and a plastic bar were required to disassemble the rear combination lamp unit from the vehicle body while requiring 3 to 5 minutes for disassembling operation for the rear combination lamp unit and 25 to 30 minutes for a cleaning operation for the surface of the rear combination lamp unit housing and the painted surface of the vehicle body panel. Thus, Test 4 has revealed that the pressure sensitive sealant composition of the present invention used in the clearance between the rear combination lamp unit housing and the vehicle body panel not only can provide an excellent water-tight seal but also can largely reduce the operational time required for disassembly of the rear combination lamp unit from the vehicle body.

As appreciated from the above, the pressure sensitive sealant composition of the present invention can exhibit an excellent water-tight seal under environmental conditions where automotive vehicles are used, for example, in case of being employed in the clearance between the automotive vehicle body panel and the rear combination lamp unit housing. Besides, the pressure sensitive sealant composition of the present invention can be easily removed from the surface of the base members (to which the sealant composition are stuck) without leaving remains of the sealant composition on the surface of the base members (the vehicle body panel and the combination lamp unit housing), thereby largely improving operational efficiency when the rear combination lamp unit is repaired or disassembled from the vehicle body.

The entire contents of Japanese Patent Application P10-296798 (filed Oct. 19, 1998), of which priority is claimed in the present application, are incorporated herein by reference.

Although the invention has been described above by reference to certain embodiments of the invention, the invention is not limited to the embodiments described above. Modifications and variations of the embodiments described above will occur to those skilled in the art, in light of the above teachings. The scope of the invention is defined-with reference to the following claims.

What is claimed is:

1. A removable pressure sensitive sealant composition consisting essentially of:
    (a) 10–40 wt % of a component A that is at least one copolymer selected from the group consisting of hydrogenated styrene-butadiene copolymers, hydrogenated styrene-isoprene copolymers, and modified copolymers thereof;
    (b) a component B that is at least one tackifier selected from the group consisting of petroleum resins, terpene resins, rosin resins, coumarone-indene resins, hydrogenated resins thereof, and modified resins thereof; and
    (c) 42–62 wt % of a component C that is a hydrocarbonic plasticizer,
wherein said pressure sensitive sealant composition is prepared by mixing together 100 parts by weight of said component A, 20–60 parts by weight of said component B, and 150–400 parts by weight of said component C.

2. A pressure sensitive sealant composition as claimed in claim 1, wherein said pressure sensitive sealant composition has a peel strength ranging from 10 to 50 N/25 mm at a temperature of about 23° C.

3. A pressure sensitive sealant composition as claimed in claim 1, further consisting essentially of 6–14 wt % of said component B.

4. A pressure sensitive sealant composition as claimed in claim 1, further consisting essentially of 25–30 wt % of said component A.

5. A pressure sensitive sealant composition as claimed in claim 1, wherein the pressure sensitive sealant composition can be peeled off from a surface without leaving remains of the pressure sensitive sealant composition on the surface.

6. A pressure sensitive sealant composition as claimed in claim 1, consisting essentially of:
    (a) 10–40 wt % of a component A that is at least one copolymer selected from the group consisting of hydrogenated styrene-butadiene copolymers, hydrogenated styrene-isoprene copolymers, and modified copolymers thereof;
    (b) a component B that is at least one tackifier selected from the group consisting of petroleum resins, terpene resins, rosin resins, coumarone-indene resins, hydrogenated resins thereof, and modified resins thereof; and (c) 42–62 wt % of a component C that is a hydrocarbonic plasticizer, wherein said pressure sensitive sealant composition is prepared by mixing together 100 parts by weight of said component A, 20–60 parts by weight of said component B, and 150–400 parts by weight said component C and wherein said hydrocarbonic plasticizer is selected from the group consisting of liquid paraffin, polybutene and liquid polybutadiene.

7. A method for sealing a member, comprising:

mixing together (a) 100 parts by weight of a component A that is at least one copolymer selected from the group consisting of hydrogenated styrene-butadiene copolymers, hydrogenated styrene-isoprene copolymers, and modified copolymers thereof; (b) 20–60 parts by weight of a component B that is at least one tackifier selected from the group consisting of petroleum resins, terpene resins, rosin resins, coumarone-indene resins, hydrogenated resins thereof, and modified resins thereof; and (c) 150–400 parts by weight of a component C that is a hydrocarbonic plasticizer, thereby to prepare a removable pressure sensitive sealant composition consisting essentially of 10–40 wt % of said component A, said component B, and 42–62 wt % of said component C;

heating said pressure sensitive sealant composition; and applying said heated pressure sensitive sealant composition to the member.

8. A method as claimed in claim 7, further comprising discharging said pressure sensitive sealant composition through a nozzle.

9. A method as claimed in claim 8, wherein said discharging includes forming said pressure sensitive sealant composition into state of a bead.

10. A method as claimed in claim 9, further comprising setting said applied pressure sensitive sealant composition at a position to be used, in which said pressure sensitive sealant composition is compressed within a range of not higher than 80% in a cross-sectional height of said pressure sensitive sealant composition of the bead state.

11. A method for sealing a member, comprising:

mixing together (A) 100 parts by weight of a component A that is at least one copolymer selected from the group consisting of hydrogenated styrene-butadiene copolymers, hydrogenated styrene-isoprene copolymers, and modified copolymers thereof; (B) 20–60 parts by weight of a component B that is at least one tackifier selected from the group consisting of petroleum resins, terpene resins, rosin resins, coumarone-indene resins, hydrogenated resins thereof, and modified resins thereof; and (C) 150–400 parts by weight of a component C that is a hydrocarbonic plasticizer, thereby to prepare a removable pressure sensitive sealant composition consisting essentially of 10–40 wt % of said component A, said component B, and 42–62 wt % of said component C;

forming said pressure sensitive sealant composition into a predetermined shape; and applying said pressure sensitive sealant composition of the predetermined shape to the member.

12. A method as claimed in claim 11, wherein said forming includes forming said pressure sensitive sealant composition into state of a bead.

13. A method as claimed in claim 12, further comprising setting said applied pressure sensitive sealant composition at a position to be used, in which said pressure sensitive sealant composition is compressed within a range of not higher than 80% in a cross-sectional height of said pressure sensitive sealant composition of the bead state.

* * * * *